A. TRIOU.
LOCKING DEVICE FOR GREASE CUPS.
APPLICATION FILED AUG. 19, 1912.
1,090,766.
Patented Mar. 17, 1914.
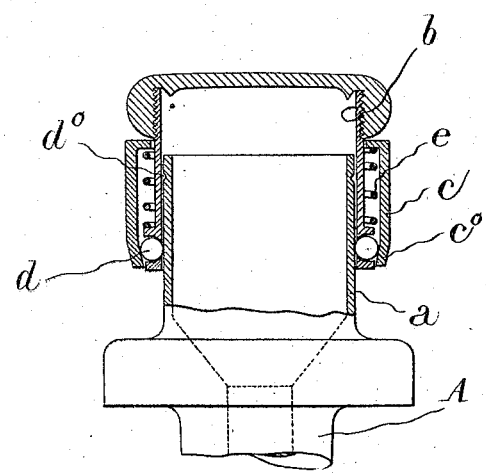
Witnesses:
Norris L. Sumby.
Inventor
André Triou

UNITED STATES PATENT OFFICE.

ANDRÉ TRIOU, OF SEINE, FRANCE.

LOCKING DEVICE FOR GREASE-CUPS.

1,090,766.

Specification of Letters Patent.

Patented Mar. 17, 1914.

Application filed August 19, 1912. Serial No. 715,928.

*To all whom it may concern:*

Be it known that I, ANDRÉ TRIOU, engineer, a citizen of the French Republic, residing in Henri-Littolf aux Vallees, Seine, France, have invented certain new and useful Improvements in Locking Devices for Grease-Cups, of which the following is a specification.

The present invention has reference to locking devices for grease cups and the like, and it proposes, briefly, an improved device of the general class indicated which is designed for use in connection with a grease cup, or other article of a similar character, to lock the cap or corresponding element in place after adjustment, and, subsequently, to terminate or release such locking action for the purpose of permitting removal of the cap.

With the above and other objects in view, the invention comprehends a ball clutch which is actuated through the direct agency of the cap, to hold the latter in adjusted position, and which has associated with it certain adjuncts that serve to release the clutch action of the ball.

The accompanying drawing shows a vertical sectional view of a grease cup equipped with the improved locking device.

In said drawing, the part to which the grease cup is attached is indicated by the letter A, irrespective of the character of such part, since the invention is concerned only with the device associated with the grease cup.

The grease cup may be of any desired type, but it is to be understood that no limitation to the type shown, nor, in fact, to a grease cup itself, is contemplated, for the reason that the invention is applicable to any article of an analogous nature comprising a body, and a cap adjustably carried thereby, these parts being indicated, respectively, by the letters $a$ and $b$.

Referring more particularly to the drawing, the cap $b$ is slidably fitted upon the body $a$ and is itself encircled, in turn, by a slidable sleeve-like element $c$. The balls $d$ are carried in flanged openings in the lower portion of the cap and frictionally engage the outer surface or wall of body $a$. The sleeve $c$ is held in raised position by an expansible spring $e$, and is formed with an in-turned bottom portion $c^0$ with which the balls $d$ also coact, this portion $c^0$ constituting the female member of the clutch. Depression of sleeve $c$ will effect unshipping of the clutch.

To prevent accidental disengagement of the body $a$, the latter is formed with a circumferential groove $d^0$ which serves to give audible notice of the cap reaching the position where the clutch action begins to take place, since a slight click is heard when the balls pass over the groove.

I claim as my invention:—

1. In a device of the class specified, the combination of a body part; an adjustable cap encircling said body and slidable endwise thereon; a series of clutch elements carried by said cap; and an annular member encircling said cap and slidable endwise thereon for forcing said clutch elements into binding engagement with said body to hold the cap in adjusted position thereon.

2. In a device of the class specified, the combination of a hollow, open-topped cylindrical container; an adjustable cap slidably encircling said container and covering the top thereof; a series of clutch elements carried by said cap; and an annular member slidably encircling said cap for forcing said clutch elements into binding engagement with said container, to hold the cap in adjusted position thereon.

3. In a device of the class specified, the combination of a body part; an adjustable cap encircling said body and slidable endwise thereon; a series of clutch elements carried by said cap; an annular member encircling said cap and slidable endwise thereon for forcing said clutch elements into binding engagement with said body to hold the cap in adjusted position thereon; and means for normally holding said member in operative position.

4. In a device of the class specified, the combination of a body part; a cap encircling said body and slidable endwise thereon in opposite directions, said cap being formed with a series of seats: a series of clutch elements mounted in said seats and movable into and out of binding engagement with said body to hold said cap in adjusted position thereon; and an annular member encircling said cap and slidable endwise thereon in opposite directions, said member having an in-turned portion coöperative with said clutch elements for forcing the same into, or releasing them from, such engagement.

5. In a device of the class specified, the combination of a body part; a cap encircling said body and slidable endwise thereon in opposite directions, said cap being formed with a series of seats; a series of clutch elements mounted in said seats and movable into and out of binding engagement with said body to hold said cap in adjusted position thereon; an annular member encircling said cap and slidable endwise thereon in opposite directions, said member having an in-turned portion coöperative with said clutch elements for forcing the same into, or releasing them from, such engagement; and means for normally holding said member in position to effect such engagement.

6. In a device of the class specified, the combination of a body part; a cap encircling said body and slidable endwise thereon in opposite directions, said cap being formed with a series of seats; a series of clutch elements mounted in said seats and movable into and out of binding engagement with said body to hold said cap in adjusted position thereon; an annular member encircling said cap and slidable endwise thereon in opposite directions, said member having an in-turned portion coöperative with said clutch elements for forcing the same into, or releasing them from, such engagement; and a spring interposed between said cap and said member and acting against the latter, to normally hold it in position to effect such engagement.

7. In a device of the class specified, the combination of a body part; an adjustable cap encircling said body and slidable endwise thereon; a series of clutch elements carried by said cap; an annular member encircling said cap and slidable endwise thereon for forcing said clutch elements into binding engagement with said body to hold the cap in adjusted position thereon; and a spring interposed between said cap and said member and acting against the latter, to normally hold it in operative position.

In testimony whereof I have hereunto set my hand in presence of two subscribing witnesses.

ANDRÉ TRIOU.

Witnesses:
H. C. COXE,
PAUL BLUM.